(12) United States Patent
Martin et al.

(10) Patent No.: US 7,478,532 B2
(45) Date of Patent: Jan. 20, 2009

(54) TURBOCHARGER CONTAINMENT SHIELD

(75) Inventors: Steven P. Martin, Walnut, CA (US); Christopher O. Meade, Redondo Beach, CA (US); Syed M. Shahed, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 425 days.

(21) Appl. No.: 11/268,364

(22) Filed: Nov. 7, 2005

(65) Prior Publication Data

US 2007/0101715 A1  May 10, 2007

(51) Int. Cl.
*F02B 33/44* (2006.01)

(52) U.S. Cl. ..................... 60/605.1; 415/200
(58) Field of Classification Search ............... 60/605.1, 60/605.2; 415/200
See application file for complete search history.

(56) References Cited

U.S. PATENT DOCUMENTS

| 4,541,786 A | 9/1985 | McLean |
| 4,735,556 A | 4/1988 | Fujikake et al. |
| 4,818,176 A * | 4/1989 | Huether et al. ................. 415/9 |
| 5,569,019 A * | 10/1996 | Katariya et al. ............. 415/200 |
| 5,810,556 A | 9/1998 | Northam et al. |
| 6,082,975 A | 7/2000 | Lahens |
| 6,238,617 B1 | 5/2001 | Strasser et al. |
| 6,695,599 B2 * | 2/2004 | Uchida et al. ............. 418/55.4 |
| 6,748,742 B2 * | 6/2004 | Rouse et al. .................. 60/611 |
| 2004/0018102 A1 | 1/2004 | Wand et al. |
| 2004/0223847 A1 | 11/2004 | Cvjeticanin et al. |
| 2005/0160732 A1 | 7/2005 | Herz et al. |
| 2005/0284596 A1 * | 12/2005 | Conley et al. ............ 162/157.3 |

* cited by examiner

*Primary Examiner*—Hoang M Nguyen
(74) *Attorney, Agent, or Firm*—Alston & Bird

(57) ABSTRACT

A turbocharger includes a compressor housing and a turbine housing wherein at least one of the compressor housing and the turbine housing includes an anti-ballistic material such as, for example, aramid fibers, S glass fibers and/or carbon fibers. A turbocharger system optionally includes a temperature controller that controls temperature in instances where operational temperatures may be detrimental to the performance characteristics of anti-ballistic material. Various other exemplary devices, methods, systems, etc., are also disclosed.

8 Claims, 5 Drawing Sheets

EXEMPLARY TURBOCHARGER
520

TURBOCHARGER CONTAINMENT SHIELD

TECHNICAL FIELD

Subject matter disclosed herein relates generally to turbochargers for internal combustion engines and, in particular, specialty materials to assist in burst containment.

BACKGROUND

Turbochargers can fail for a variety of reasons. For example, introduction of a foreign body into a compressor or exhaust turbine can cause damage that leads to immediate failure or subsequent failure (e.g., due to imbalance, etc.). Other causes of failure relate to lubricant quality and supply. In some instances, excessive operating temperatures can lead to failure. Turbocharger overspeed (e.g., 30% over rated speed) can result in immediate failure of a wheel, also referred to as wheel burst.

In some instances, failure is associated with fragmentation of components such as fragmentation of the turbine wheel or the compressor wheel. Various mechanisms exist for containment of such fragments. With respect to compressor housings, aluminum is often used to mitigate weight and at a thickness to contain fragments in the case of a catastrophic failure. However, with respect to turbine housings, cast iron or steel is often used, which adds significantly to the weight of the turbocharger.

As described herein, opportunities exist for improved mechanisms for containment of fragments in the event of a catastrophic compressor or turbine wheel failure. Various exemplary mechanisms optionally allow for weight reduction.

BRIEF DESCRIPTION OF THE DRAWINGS

A more complete understanding of the various methods, systems and/or arrangements described herein, and equivalents thereof, may be had by reference to the following detailed description when taken in conjunction with the accompanying drawings wherein.

DETAILED DESCRIPTION

Figure 1:
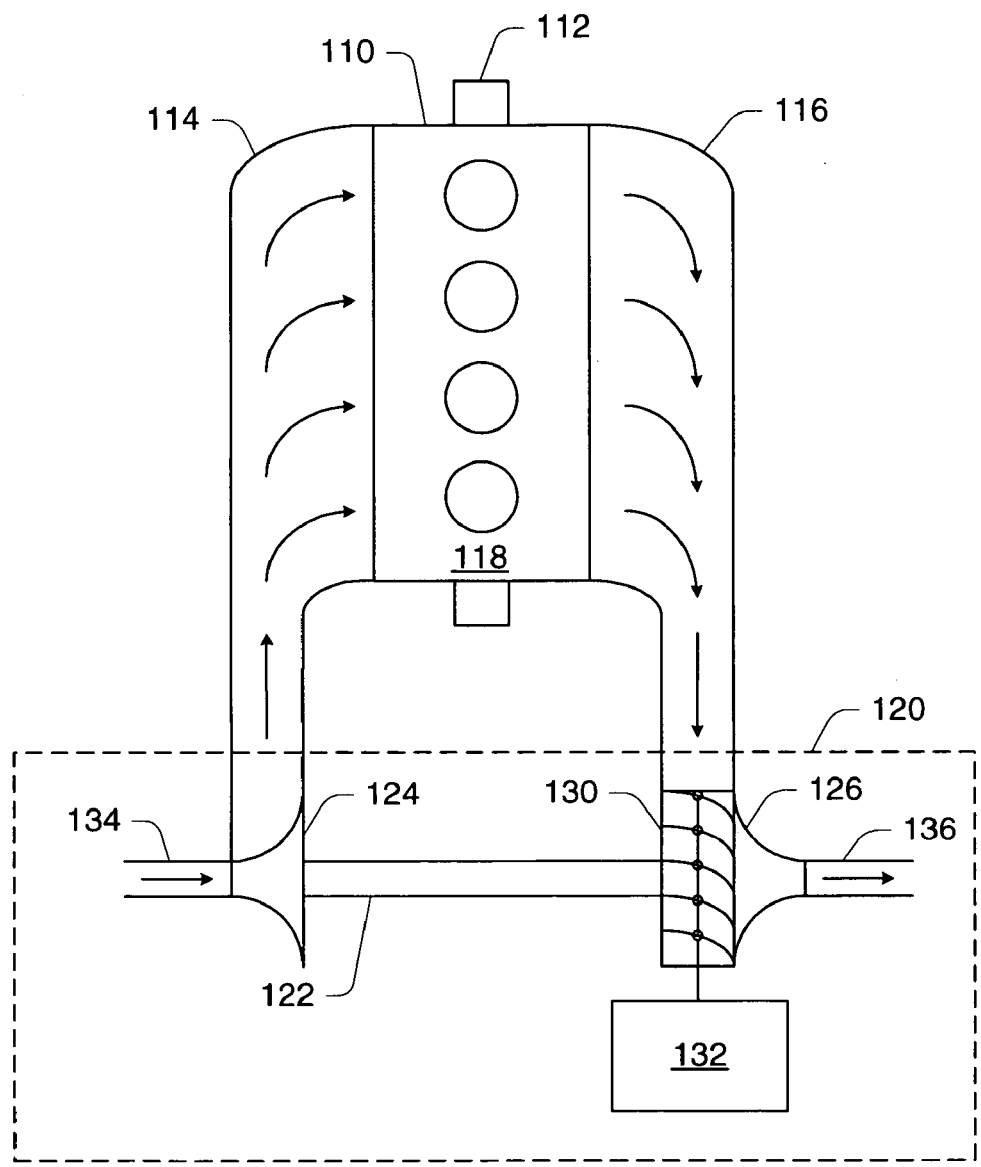
FIG. 1 is a simplified approximate diagram illustrating a prior art turbocharger system.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, and an exhaust outlet 136.

Referring to the turbine 126, such a turbine optionally includes a variable geometry unit 130 and a variable geometry controller 132. The variable geometry unit 130 and variable geometry controller 132 optionally include features such as those associated with commercially available variable geometry turbochargers (VGTs), such as, but not limited to, the GARRETT® VNT™ and AVNT™ turbochargers, which use multiple adjustable vanes to control the flow of exhaust across a turbine.

Adjustable vanes positioned at an inlet to a turbine typically operate to control flow of exhaust to the turbine. For example, GARRETT® VNT™ turbochargers adjust the exhaust flow at the inlet of a turbine rotor in order to optimize turbine power with the required load.

A variety of control schemes exist for controlling geometry, for example, an actuator tied to compressor pressure may control geometry and/or an engine management system may control geometry using a vacuum actuator. Overall, a VGT may allow for boost pressure regulation which may effectively optimize power output, fuel efficiency, emissions, response, wear, etc. Of course, an exemplary turbocharger may employ wastegate technology as an alternative or in addition to aforementioned variable geometry technologies.

Figure 2:
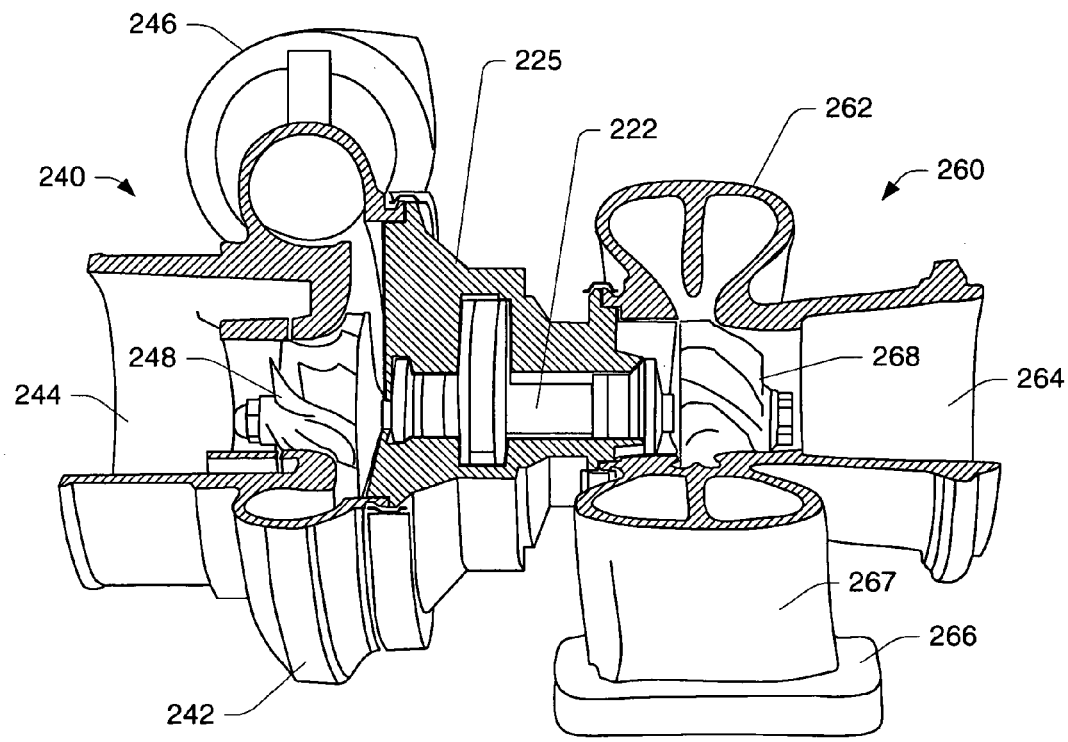
FIG. 2 is a cut-away view of a prior art turbocharger system.

FIG. 2 shows a turbocharger assembly 220 suitable for use as the turbocharger 120 of FIG. 1. The assembly 220 includes a compressor unit 240 and an exhaust turbine unit 260. The compressor unit 240 includes a compressor housing 242 having an air inlet portion 244 and an air outlet portion 246. The compressor housing 242 houses a compressor wheel 248 and defines a volute or scroll that acts in conjunction with the wheel 248 to compressor inlet air.

The exhaust turbine unit 260 includes a turbine housing 262 having an exhaust outlet portion 264 and a flange 266 associated with an exhaust inlet portion 267. The turbine housing inlet flange 266 often acts as the reference point for fixing turbocharger position relative to its installation and acts as the main load bearing interface for the turbocharger 220. The turbine housing 262 houses a turbine wheel 268 and defines one or more volutes that act to direct exhaust gas from the exhaust inlet to the wheel 268.

A shaft 222, which may be a multi-component shaft, operably connects the turbine wheel 268 and the compressor wheel 248. A center housing 225 houses at least a portion of the shaft 222 and connects the compressor housing 240 and the turbine housing 260. As described herein, a housing (e.g., compressor, turbine, center, etc.) may be a multi-component housing.

The compressor wheel 248 and the turbine wheel 268 are typically designed to operate at high rotational speed, for example, in excess of 100,000 rpm. As rotational speed increases beyond maximum recommended operational speed, internal stresses may cause weakening of a wheel and, in turn, lead to bursting, i.e., a catastrophic failure of the wheel.

Wheel or "hub" burst results in wheel fracture and, hence, high speed projectiles (e.g., wheel fragments, etc.). Respective housings (e.g., 240, 260) typically act to contain such projectiles. For example, turbine housings may be manufactured in various grades of spheroidal graphite iron to deal with thermal fatigue and wheel burst containment. A containment shroud may also be used for containment.

Other mechanisms leading to wheel fracture include wheel blade failure, shaft failure and introduction of matter into inlet streams (e.g., air borne debris or engine debris).

As described herein, various exemplary technologies pertain to containment in the case of turbocharger failure. In particular, various components are constructed at least in part from one or more specialty materials such as a ballistic material, a composite material or a combination of ballistic and composite materials.

Regarding manufacture of a housing, molding can be used for some specialty materials. Bonding is another suitable process for some specialty materials. In various examples, mechanical fixation (e.g., mechanical fasteners, etc.) can be used for various specialty materials. In some instances, a specialty material can be applied to a substrate and substrate/specialty material attached to a housing material (e.g., via mechanical fastening, etc.).

Various exemplary technologies discussed herein result in reduced turbocharger weight. Further, various examples include temperature control or restriction to promote longevity of a specialty material or an attachment mechanism related thereto (e.g., bonding). Yet further, various exemplary technologies result in thermal insulation such that the turbocharger skin temperature is sufficiently lowered, for example, such that additional thermal barriers are no longer required.

Specialty materials to assist in burst containment include organic materials and inorganic materials. Such materials may be provided in the form of fibers. For example, organic fibers such as aramid (aromatic polyamides), (KEVLAR® (E. I. du Pont de Nemours and Co., Wilmington, Del.), TWARON®), polyethylene (SPECTRA®), liquid crystal polymers (VECTRAN®) fibers and carbon fibers may be suitable. With respect to inorganic fibers, S-glass fibers, E-glass fibers, boron fibers, alumina fibers, zirconia-silica fibers, alumina-silica fibers, etc., may be suitable.

Organic SPECTRA® fibers are an ultra high molecular weight polyethylene that has one of the highest strength to weight ratios of any man-made fiber. A particular product (SPECTRA SHIELD®) uses such fibers to form a thin, flexible ballistic composite with two layers of unidirectional fibers held in place by flexible resins. In this non-woven product, the fibers are arranged so they cross each other at about 0 degree and 90 degree angles where fiber and resin layers are sealed between two thin sheets of polythylene film.

An exemplary specialty material includes fibers oriented in a first direction and fibers oriented in a second direction where the fibers oriented in the first direction cross the fibers oriented in the second direction at one or more angles that are based at least in part on burst mechanics of a turbocharger turbine wheel or compressor wheel. For example, such wheels have an axis of rotation and upon failure direct pieces primarily outwardly. Thus, an exemplary specialty material may orient fibers to enhance containment radially outward from the rotational axis of a wheel. Further, pieces resulting from failure may impact the housing and rebound. A specialty material may orient fibers to control rebound direction and/or to provide for a more collision absorbency between a piece and the housing.

Organic KEVLAR® fibers are manmade aramid fibers, with a combination of properties allowing for high strength with low weight, high chemical resistance, and high cut resistance. An improved form is marketed as KEVLAR® PROTERA, a high-performance fabric that allows lighter weight, more flexibility, and greater ballistic protection due to tensile strength and energy-absorbing capabilities increased by the development of a spinning process. KEVLAR® is a very crystalline polymer with a melting temperature of about 500° C. (932° F.).

KEVLAR® fibers are para-aramid while, for example, NOMEX® fibers are meta-aramid. In general, an aramid is a polyamide where at least 85% of the amide bonds are attached to aromatic rings. KEVLAR® fiber chains are ordered in long parallel chains where the benzene aromatic ring has a radial orientation that gives the molecule a symmetric and highly ordered structure that forms rod-like structures with a simple repeating backbone. This creates an extremely strong structure that has few weak points and flaws. KEVLAR® fibers are flame resistant and self-extinguishing.

With respect to NOMEX® fibers, they exhibit electrical insulation properties at high temperatures, do not flow or melt upon heating and do not degrade or char at temperatures until well over 370° C. The compound that is usually found in fire-fighters coats and airline seat covers is NOMEX® III, which is a composite of 95% NOMEX® and 5% KEVLAR®, where KEVLAR adds stability and tear resistance to the material.

Many inorganic fibers include glass such as S glass (e.g., S-2® glass, Owens-Corning). S glass refers to a family of high strength glass fibers or yarn. As with organic fibers, such inorganic fibers may be woven or non-woven as a fabric. Inorganic S glass woven fabric can have a high tensile strength.

With respect to combinations of organic and inorganic materials, various specialty materials may be combined to achieve suitable properties or cost. For example, S glass and KEVLAR® may be combined to form a composite specialty material. Of course, composites of inorganic materials or composites of organic materials may be used where appropriate. For example, a lightweight and impact resistant fabric includes carbon and KEVLAR®. An exhaust gas chamber marketed by Arrow Special Parts S.p.A. (Italy) includes carbon and KEVLAR® fiber.

Another specialty material is titanium silicon carbide. This material combines the strength, hardness, and heat resistance of a ceramic with the machinability and ductility of a metal and it resists oxidation as well as chromium up to 1,000° C. In general, inorganic materials can withstand higher temperatures than organic materials, with the exception of carbon fiber. An approximate order of increasing resistance to high temperature is polyethylene <aramid <glass <$Al_2O_3$<carbon.

Regarding anti-ballistic properties or capabilities of various specialty materials, the traditional approach to stopping a bullet was to engage the bullet with thousands of individual fibers where these fibers would stretch and break as energy was transferred outward through the fibers into the weave. Some specialty materials (e.g., SPECTRA SHIELD® material) aim to disperse energy faster and across a wider surface than possible with traditional woven fabric by non-woven construction techniques, some of which aim to handle angle shot situations.

Thus, as discussed above, various specialty materials are available for construction of anti-ballistics.

Various exemplary housings include one or more specialty materials that aid in burst containment. For example, a compressor housing includes a lightweight aluminum core at least partially covered with a shell that includes KEVLAR® material. In this example, the KEVLAR® shell is bonded or otherwise fixed to the lightweight aluminum core and the aluminum core defines various flow boundaries while the shell provides for burst containment. The aluminum core is optionally treated with a coating that may serve one or more purposes (e.g., anti-corrosion, reduced drag, reflection of infrared energy, etc.). The compressor housing may include a thermal barrier or insulating layer that at least partially surrounds the housing.

In general, compressor side temperatures do not exceed 500° C. for a gasoline or a diesel engine fitted with a turbocharger. However, exhaust side temperatures often exceed 500° C. (932° F.), which is approximately an upper temperature for KEVLAR® material (e.g., often listed as the melting temperature for KEVLAR® fiber). For diesel engines, maximum exhaust temperatures in excess of 500° C. (932° F.) may occur (e.g., typically less than 800° C. (~1,500° F.)). Peak temperatures are typically reached under sustained full power or heavy load.

While operation of a turbocharger depends on extracting energy from an exhaust stream, various turbocharger/engine systems perform adequately where exhaust temperature does not exceed 500° C. (932° F.). Thus, in a temperature limited system, a turbine housing includes KEVLAR® material. In general, a temperature limited system pertains to a diesel fuel engine having one or more mechanisms to directly or indirectly control or limit exhaust gas temperature (e.g., turbodiesel).

While various temperature constraints for specialty materials are discussed, other specialty materials may not exhibit such constraints. In general, where constraints exist, measures may be taken to insult the specialty material or to control temperature. Where a specialty material can withstand operating temperatures, for example, in excess of about 1,500° F., such measures are optional.

With respect to a controlled temperature system, a particular turbocharger system, referred to commercially as the Turbo-Glide system (Turbo-Glide Pty Ltd., Russellvale, NSW, Australia), includes temperature control to keep the exhaust gas temperature below 500° C. These systems use turbochargers supplied by Honeywell Normalair-Garrett (Chipping Norton, NSW, Australia). The systems include an exhaust gas thermocouple.

Figure 3:
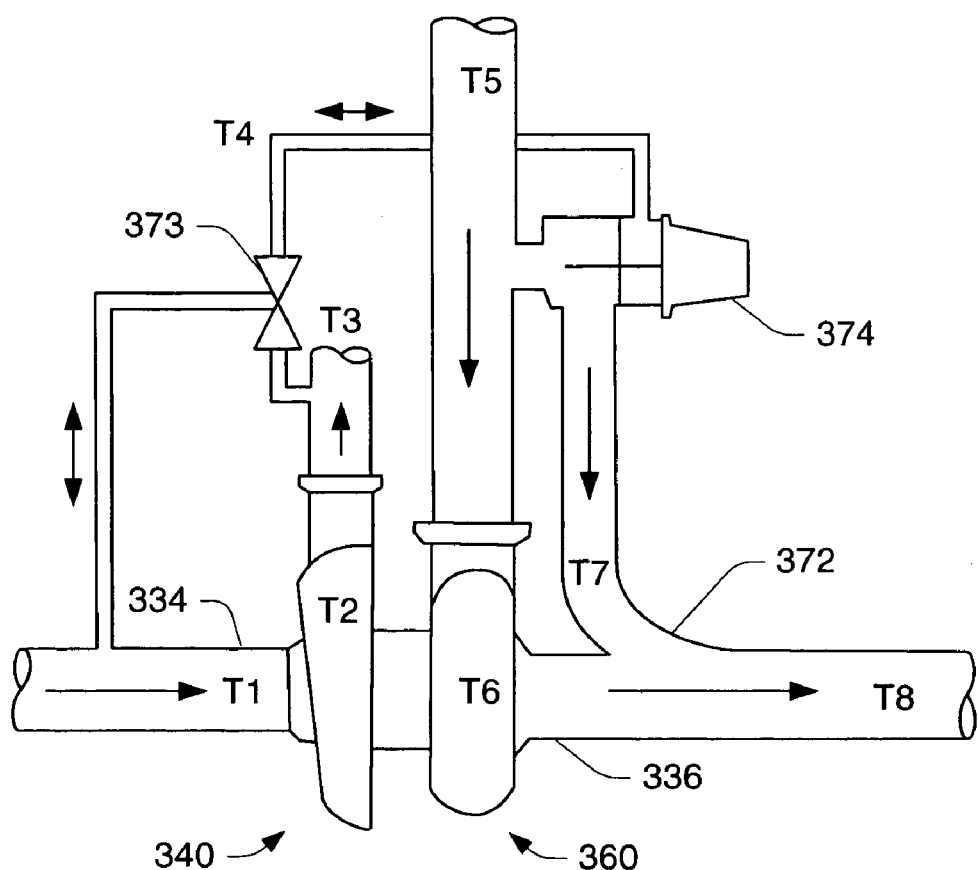
FIG. 3 is a simplified approximate diagram illustrating an exemplary turbocharger system with temperature control mechanisms.

FIG. 3 shows an exemplary turbocharger system 300 where various temperatures (T1-T8) are shown. Arrows indicate the direction of air flow or exhaust flow. In general, the lowest temperature is that of ambient air (T1) at the inlet conduit 334 to the compressor assembly 340. The compressor assembly 340 acts to increase the air temperature such that T2 exceeds T1. Compressed air exiting the compressor 340 has a temperature T3, which is approximately the same as T2.

The system 300 includes a valve 373 that can adjust air flow to the exhaust stream or more commonly flow from the exhaust stream to the inlet stream (e.g., exhaust gas recirculation or "EGR"). Another valve 374 may be a wastegate valve or an EGR valve that allows at least some exhaust to bypass the turbine assembly 360 for purposes of reducing exhaust flow to the turbine assembly 360 or for purposes of EGR.

The turbine assembly 360 receives at least some exhaust from the engine, which, again, is at temperature T5. In general, T5 is the highest temperature in the system 300. The temperature of the turbine assembly 360, T6, is generally less than that of the exhaust (i.e., T6<T5) because the turbine assembly 360 extracts energy from the exhaust and also because some lubricant cooling may be provided as well. Hence, where the wastegate valve 373 is closed (i.e., no bypass flow), the temperature T8 of exhaust exiting the turbine 360 via the conduit 336 is less than T5 as well.

The system 300 illustrates various mechanisms for use in temperature control of an exhaust turbine assembly 360. Some of the mechanisms may be based on mixing while others may act to alter combustion reactions, turbocharger operation, etc., and thereby maintain or change exhaust temperature.

The system 300 optionally includes one or more temperature sensors. For example, measurement of temperatures T5 and T8 can provide information as to turbocharger efficiency and performance. As discussed herein, such measurements may be used to control temperature with respect to a specialty material used for containment should a catastrophic failure of a turbocharger component or components occur. An exemplary turbocharger system optionally includes a temperature controller that controls temperature in instances where operational temperatures may be detrimental to the performance characteristics of the anti-ballistic material.

Figure 4:
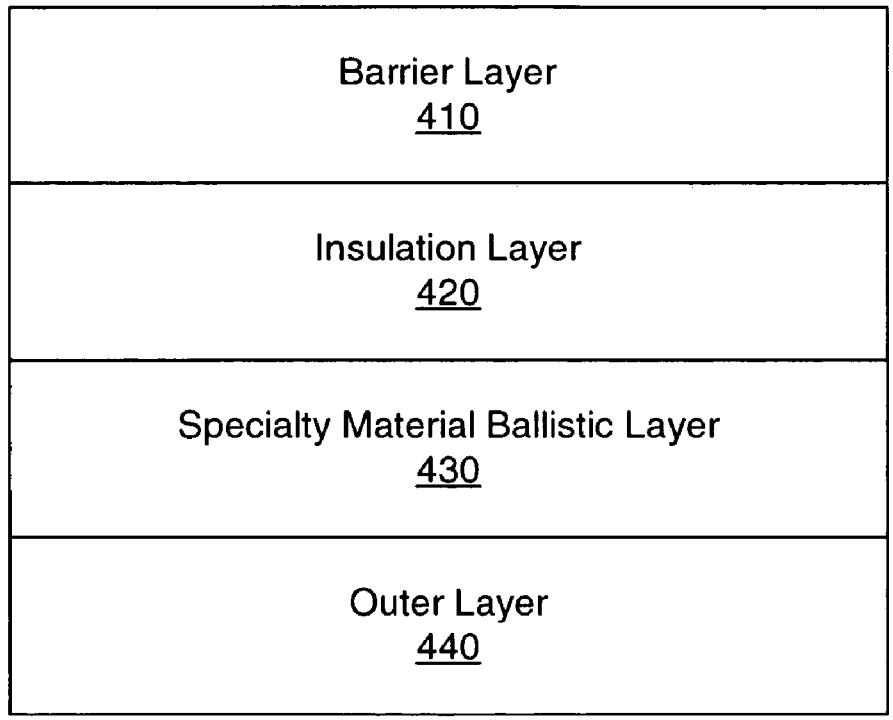
FIG. 4 is cross-sectional view of a layered housing that includes at least one specialty material to contain fragments or components.

FIG. 4 shows an exemplary layering of materials 400 for a containment shield or housing. In this example, four layers 410, 420, 430 and 440 are shown, however, more or few layers may be used (e.g., omitted, repeated, etc.). Layer 410 is a barrier layer that may be part of a compressor housing or turbine housing or other turbocharger component. The barrier layer 410 is capable of withstanding operating temperatures associated with a particular part of a turbocharger system (see, e.g., the system 300 of FIG. 3 and associated temperatures).

The layering 400 optionally includes an insulation layer 420. The insulation layer 420 acts to insulate the barrier layer 410 from one or more other layers. The purpose of the insulation layer 420 may be to retain heat energy for operational efficiency, to ensure that one or more other layers do not experience excessive temperature (e.g., detrimental to the one or more other layers), or a combination of both heat energy retention and layer thermal protection.

The specialty material anti-ballistic layer 430 acts to contain fragments in the case of a turbocharger failure. Such fragments may be turbocharger component fragments or foreign matter introduced to a compressor or an exhaust turbine. The specialty material is optionally selected from any of the various specialty materials described herein.

The layering 400 optionally includes an outer layer 440. The outer layer 440 may serve to protect the specialty material anti-ballistic layer 430 or, for example, to provide a desired finish to the turbocharger or component thereof. As described herein, the barrier layer 410, the optional insulating layer 420 and the optional outer layer 430 act to address heat transfer via material properties such as orientation (e.g., dimensional heat conduction), surface finish (e.g., reflective or absorptive), infrared transmission related-properties, etc.

Figure 5:
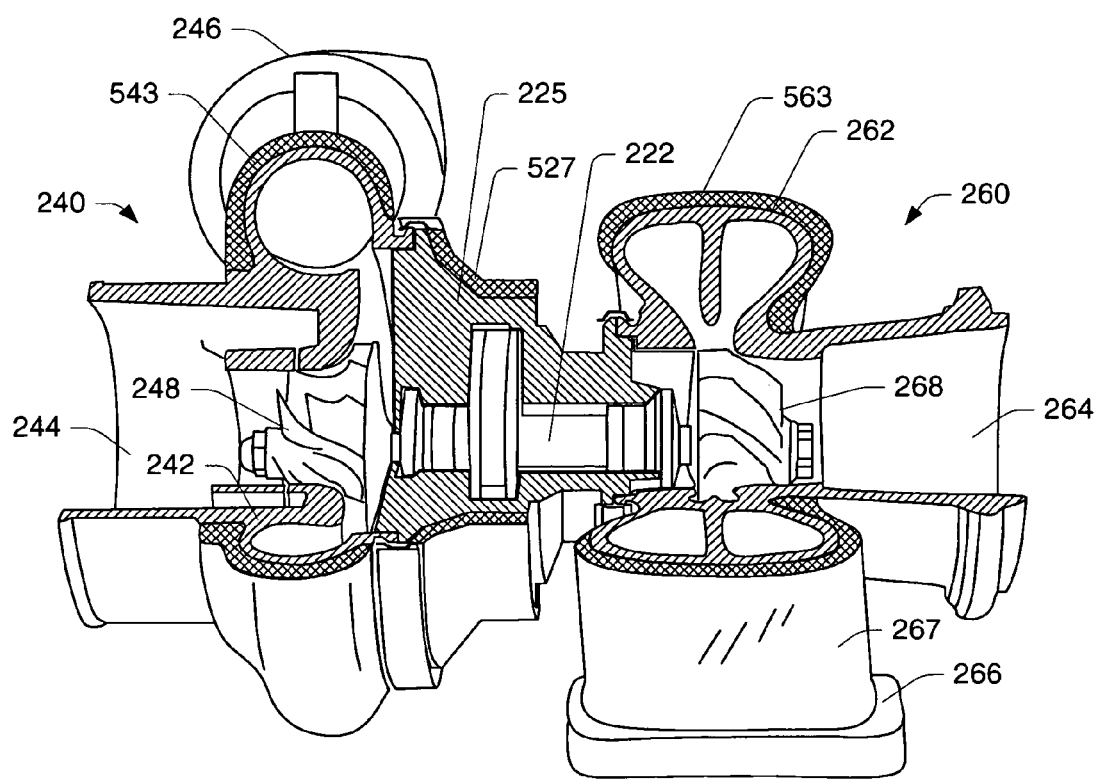
FIG. 5 is a cut-away view of an exemplary turbocharger system that includes a specialty material for containment of fragments.

FIG. 5 shows an exemplary turbocharger 520 that includes various features of the turbocharger 220 of FIG. 2. However, the turbocharger 520 includes one or more specialty materials to aid in containment should failure occur. In particular, the compressor housing 242 includes a containment layering 543. In this example, the compressor housing 242 is optionally a prior art aluminum compressor housing whereby a specialty material layer is applied to a surface of the compressor housing. While the layering 543 does not extend along the axially directed air inlet portion 244, in other examples, such layering may be applied to the outer surface of such an inlet portion 244.

Another containment layering 527 is applied to a center housing 225 of the turbocharger 520. On the exhaust turbine side 260, yet another containment layering 563 is applied to the turbine housing 262, including at least part of the exhaust inlet portion 267. Where appropriate, such layering is optionally applied to the outlet portion 264 of the turbine housing 262.

The exemplary layerings 527, 543 and 563 can use the same specialty material for purposes of containment or can optionally use specialty materials based at least in part on the upper temperature experienced by the associated region during operation of the turbocharger 520.

The turbocharger 520 has a compressor housing and/or a turbine housing that optionally includes aramid fibers (e.g., KEVLAR®, etc.). In such an example, a temperature controller may be used to control temperature of exhaust gas to the turbine housing. For example, such a temperature controller can control various operating parameters to prevent the temperature of the exhaust gas from exceeding approximately 500° C.

In another example, the turbocharger 220 of FIG. 2 is surrounded by one or more molded specialty material components (e.g., shroud components, etc.). For example, a substantially cylindrical specialty material component having an inner diameter approximately that of the outer diameter of the compressor housing scroll is fitted and secured to the compressor housing 242, with appropriate dimensional provisions for the outlet portion 246. Such a cylindrical specialty material component is optionally fitted to the turbine housing where the inner diameter approximates the outer diameter of the volute portion of the turbine housing 262, with appropriate dimensional provisions for the inlet portion 267.

In this example, the center housing 225 is optionally surrounded by a portion of the compressor side cylindrical specialty material component and/or by a portion of the turbine side cylindrical specialty material component. Alternatively, a separate specialty material component (e.g., substantially cylindrical, etc.) is fitted around the center housing 225.

Various containment mechanisms described herein are optionally used in instances where an exhaust turbine is mounted without an attached compressor (e.g., generator) or where a compressor is mounted with an attached exhaust turbine (e.g., motor driven).

Various containment mechanisms are optionally suitable for use with turbine or compressor wheels constructed from composite or other non-traditional materials.

Although some exemplary methods, devices, systems, etc., have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A turbocharger comprising:
    a compressor housing; and
    a turbine housing;
    wherein at least one of the compressor housing and the turbine housing comprises aramid fibers.

2. The compressor housing of claim 1 wherein the aramid fibers comprise para-aramid fibers.

3. The compressor housing of claim 1 wherein the aramid fibers comprise meta-aramid fibers.

4. The turbocharger of claim 1 further comprising a temperature controller to control temperature of exhaust gas to the turbine housing.

5. The turbocharger of claim 4 wherein the temperature controller prevents the temperature of the exhaust gas from exceeding approximately 500° C.

6. The turbocharger of claim 1 further comprising a center housing comprising aramid fibers.

7. A turbocharger comprising:
    a compressor housing; and
    a turbine housing;
    wherein at least one of the compressor housing and the turbine housing comprises aramid fibers, and
    wherein at least one of the compressor housing and the turbine housing comprises fibers selected from a group consisting of S glass fibers and carbon fibers.

8. The turbocharger of claim 7 further comprising a center housing comprises fibers selected from a group consisting of S glass fibers and carbon fibers.

* * * * *